United States Patent Office 2,716,128
Patented Aug. 23, 1955

2,716,128

CONDENSATION PRODUCT OF OLEFINIC HYDROCARBON WITH POLYSILOXANE AND METHOD OF PRODUCTION THEREOF

James P. West, Westmont, Ill., assignor to Universal Oil Products Company, Chicago, Ill., a corporation of Delaware No Drawing. Application May 31, 1951,
Serial No. 229,273

12 Claims. (Cl. 260—448.2)

This invention relates to a high molecular weight silicon-containing condensation product and more particularly to a condensation product of an olefin and a siloxane.

An object of this invention is to produce a high molecular weight condensation product useful as a coating material, a water repellent agent, an electrical insulating material, etc.

One embodiment of this invention relates to a condensation product of an olefinic hydrocarbon and a siloxane.

Another embodiment of this invention relates to a condensation product of ethylene and a poly(dimethyl siloxane).

A further embodiment of this invention relates to a process which comprises reacting at condensation conditions an olefinic hydrocarbon and an alkyl siloxane in the presence of a catalyst yielding free radicals at condensation conditions including a temperature at least as high as the decomposition temperature of said catalyst, and recovering the resultant condensation product.

A still further embodiment of this invention relates to a condensation process which comprises reacting a monoolefinic hydrocarbon and an alkyl siloxane in the presence of a catalyst yielding free radicals at condensation conditions including a temperature at least as high as the decomposition temperature of said catalyst, and recovering the resultant condensation product.

An additional embodiment of this invention relates to a condensation process which comprises reacting a monoolefinic hydrocarbon and an alkyl siloxane in the presence of an organic peroxy compound catalyst at condensation conditions including a temperature at least as high as the decomposition temperature of said catalyst, and recovering the resultant condensation product.

Still an additional embodiment of this invention relates to a process which comprises reacting ethylene and an alkyl siloxane in the presence of a catalyst yielding free radicals at condensation conditions including a temperature at least as high as the decomposition temperature of said catalyst, and recovering the resultant condensation product.

Still another embodiment of this invention relates to a condensation process which comprises reacting ethylene and a poly(dimethyl siloxane) in the presence of an organic peroxide catalyst at a temperature of from the decomposition temperature of said catalyst to about 150° C. higher than said decomposition temperature, and recovering the resultant condensation product.

An olefinic hydrocarbon such as ethylene, propylene, a butylene, a pentene, butadiene, pentadiene and a higher molecular weight monoolefin or polyolefin which is charged in this process may be obtained from any source. Of the different olefinic hydrocarbons which may be used, ethylene is preferred in the production of high molecular weight viscous oils and wax-like condensation products containing a minor proportion of organically combined silicon. An aryl olefin such as styrene may also be used in this process.

Organic silicon compounds which are condensed with olefinic hydrocarbons, and particularly with ethylene, in this process may be represented broadly by the formula:

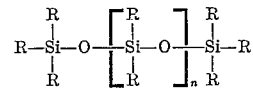

wherein R represents a member of the group consisting of an alkyl group, a cycloalkyl group, an aryl group, an alkoxy group, a cycloalkoxy group, and an aryloxy group, and $n$ is an integer from 1 to about 30. Of these different organic silicon compounds, the alkyl siloxanes are preferred, and particularly the polymethylsiloxanes including decamethyltetrasiloxane having the formula:

$$CH_3-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-O-\underset{\underset{CH_3}{|}}{\overset{\overset{CH_3}{|}}{Si}}-CH_3$$

This compound contains 36.9% by weight of silicon and has a molecular weight of 310.

Siloxanes which are sometimes referred to as silicones that are useful in this process are of three types, corresponding to: (1) the dehydration product of a silanol of the formula $R_3SiOH$ which may be called a monosilanol; (2) the dehydration product of a silane-diol of the formula $R_2Si(OH)_2$ and (3) the dehydration product of a silane-triol represented by the formula $RSi(OH)_3$. Corresponding dehydration products are listed below:

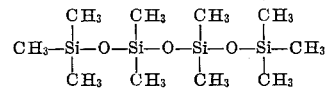

In the above indicated formulas, the R groups represent an alkyl, cycloalkyl, or aryl group. The silicones which are also referred to as siloxanes may be pure compounds containing one or more of the same or different R groups or mixtures of different siloxanes may be utilized in this process.

Catalysts utilized in this process are those capable of yielding free radicals at condensation conditions which include a temperature at least as high as the decomposition temperature of said catalysts. Such free radical producing substances include particularly the organic peroxides, such as a diacyl peroxide (for example: acetyl peroxide and benzoyl peroxide), dialkyl peroxides (for example di-tertiary-butyl peroxide), and peroxy esters (for example: tertiary-butyl peracetate and tertiary-butyl perbenzoate). Hydroperoxides such as isopropyl hydroperoxide, tert-butyl hydroperoxide, cumene hydroperoxide and others may also be used. Other free radical producing materials include metal alkyls such as a lead tetraalkyl as lead tetramethyl or lead tetraethyl, also mercury dimethyl, zinc diethyl, etc. Other free radical forming substances which may be used to catalyze this process include azo compounds such as tert-butyl diazo compounds and also dimethylcyanomethyl diazo compound.

This process may be carried out in batch type operation by placing a quantity of the siloxane or other organic silicon compound starting material and the catalyst in a reactor equipped with a mixing device, adding the olefin such as ethylene and heating the resultant reaction mixture to a reaction temperature which is at least equal to the decomposition temperature of the catalyst. The resultant reaction mixture is then cooled and the condensation product is recovered by suitable means. It is preferable, however, to carry out the reaction in a continuous manner by charging the olefin, silicon-containing organic compound, and catalyst simultaneously to a reactor which may be a baffled mixer or coil or it may contain a packing material such as fire brick, alumina and the like upon which the catalyst is deposited and retained. The resultant condensation product which is formed from the olefin and organic silicon-containing starting material such as an alkyl siloxane is then separated from the reactor effluent and unconverted starting materials also present in the effluent are recovered and recycled to the process. The reaction temperature can be controlled to an appreciable degree by adjusting the amounts of siloxane and olefin charged to the process as the excess of siloxane absorbs heat liberated during the reaction and thus prevents excessive rise in temperature. The reaction temperature must be at least as high as the decomposition temperature of the catalyst in order to liberate and form free radicals which promote condensation on the olefin and siloxane. However, the operating temperature may also exceed the decomposition temperature of the catalyst by as much as about 150° C. In the continuous method of carrying out this process, the catalyst is preferably added continuously to the reaction zone but if desired may be added intermittently, particularly when a packing material is employed which retains the catalyst in the reaction zone. The decomposition temperature of tert-butyl perbenzoate is approximately 115° C. and accordingly when this peroxy compound is used as catalyst for this process, the operating temperature is from about 115° to about 265° C. An operating temperature of from about 130° to about 280° C. is used in the presence of ditertiary butyl peroxide. Higher condensation temperatures may be employed, but little advantage is gained if the temperature is more than about 150° C. higher than the decomposition temperature of the catalyst. The general effect of increasing the operating temperature is to accelerate the rate of the condensation reaction, but the increased reaction rate is accompanied by a decrease in the molecular weight of the condensation product formed from the ethylene and silicon-containing organic compound. Thus by choosing a temperature within the indicated range, condensation products varying from wax-like solids to liquids may be obtained. Also the molecular weight of the condensation product generally increases with increasing pressure employed in the reaction zone. Although pressures of 500 atmospheres or more may be used, the preferred operating pressure of this process is from about 30 to about 250 atmospheres.

The concentration of catalyst employed in this process may also vary over a rather wide range but for reasons of economy it is desirable to use low concentration of catalysts such as from about 0.1% to about 5% by weight of the olefin charged. Higher concentrations of catalyst result in the production of condensation products with lower average molecular weights and if such products are desired, they may be prepared by using catalyst concentrations up to 15% by weight or more.

In batch type operations and also in continuous type of treatment, the reaction time may vary from about 3 minutes to about 6 hours but contact times of at least 10 minutes are usually preferred. When a solid packing material is employed, the space velocity, defined as the volume of liquid charge per hour divided by the superficial volume of the packing material should be in the range of from about 0.1 to about 10. The ratio of siloxane or other organic silicon compound to olefin charged to the reaction zone may also vary over a relatively broad range. A 1:1 ratio is satisfactory, but economy and operating conditions may determine the use of higher or lower ratios. Also in producing condensation products containing a relatively low silicon content, it is generally advisable to employ higher ratios of ethylene to siloxane such as decamethyltetrasiloxane.

The nature of this invention is illustrated further by the following example which should not be construed, however, as imposing undue restrictions on the generally broad scope of the invention.

A mixture of 47 grams of decamethyltetrasiloxane (viscosity 1.5 centistokes at 25° C.) and 5 grams of di-tert-butyl peroxide was placed in a glass lined autoclave, ethylene was added to 50 atmospheres initial pressure, and the charged autoclave was then heated at a temperature of 130–140° C. during four hours. The maximum pressure at the reaction temperature was 220 atmospheres (indicating that much ethylene had dissolved in the siloxane when the autoclave was charged). The final pressure at 140° C. was 150 atmospheres. The autoclave was permitted to cool overnight and the excess ethylene was discharged to the air. The product consisted of 99 g. of a mixture of solid white wax together with some liquid. There was also obtained 29 g. of wax outside the glass liner. The 99 g. of product in the liner was melted into a distilling flask and the excess decamethyltetrasiloxane (B. P. 192° C. at atmospheric pressure) was removed by distillation under reduced pressure. There was recovered 30 g. of unreacted siloxane. The residue was a hard white wax. This hard white wax was applied to a desk top to give a high gloss which had the same appearance as a commercial wax such as Simoniz; second, the product distills out of a test tube held over a red hot heat source without detectable discoloration, whereas a grease prepared by polymerizing ethylene using methylcyclohexane and di-tert-butyl peroxide leaves a brown deposit on similar treatment. Paraffin wax will also distill without discoloration.

I claim as my invention:

1. A condensation process which comprises reacting an olefinic hydrocarbon and a polysubstituted polysiloxane whose substituents consist of alkyl groups in the presence of a catalyst yielding free radicals at condensation conditions including a temperature at least as high as the decomposition temperature of said catalyst, and recovering the resultant condensation product.

2. A condensation process which comprises reacting an aliphatic olefinic hydrocarbon and a polysubstituted polysiloxane whose substituents consist of alkyl groups in the presence of a catalyst yielding free radicals at condensation conditions including a temperature at least as high as the decomposition temperature of said catalyst, and recovering the resultant condensation product.

3. A condensation process which comprises reacting a monoolefinic hydrocarbon and a polysubstituted polysiloxane whose substituents consist of alkyl groups in the presence of an organic peroxy compound catalyst at condensation conditions including a temperature at least as high as the decomposition temperature of said catalyst, and recovering the resultant condensation product.

4. A condensation process which comprises reacting a monoolefinic hydrocarbon and a poly(dimethyl siloxane) in the presence of an organic peroxide catalyst at a temperature of from the decomposition temperature of said catalyst to about 150° C. higher than said decomposition temperature, and recovering the resultant condensation product.

5. A condensation process which comprises reacting ethylene and a polysubstituted polysiloxane whose substituents consist of alkyl groups in the presence of a catalyst yielding free radicals at condensation conditions including a temperature at least as high as the decomposition temperature of said catalyst, and recovering the resultant condensation product.

6. A condensation process which comprises reacting ethylene and a polysubstituted polysiloxane whose substituents consist of alkyl groups in the presence of an organic peroxy compound catalyst at condensation conditions including a temperature at least as high as the decomposition temperature of said catalyst, and recovering the resultant condensation product.

7. A condensation process which comprises reacting ethylene and a poly(dimethyl siloxane) in the presence of an organic peroxide catalyst at a temperature of from the decomposition temperature of said catalyst to about 150° C. higher than said decomposition temperature, and recovering the resultant condensation product.

8. A condensation process which comprises reacting ethylene and a poly(dimethyl siloxane) in the presence of ditertiary-butyl peroxide at a temperature of from about 130° to about 280° C., and recovering the resultant condensation product.

9. A condensation process which comprises reacting ethylene and a poly(dimethyl siloxane) in the presence of a benzoyl peroxide catalyst at a temperature of from the decomposition temperature of said catalyst to about 150° C. higher than said decomposition temperature, and recovering the resultant condensation product.

10. A condensation process which comprises reacting ethylene and a poly(dimethyl siloxane) in the presence of a peroxy ester at a temperature of from the decomposition temperature of said catalyst to about 150° C. higher than said decomposition temperature, and recovering the resultant condensation product.

11. A condensation process which comprises reacting ethylene and a poly(dimethyl siloxane) in the presence of tertiary-butyl perbenzoate at a temperature of from the decomposition temperature of said catalyst to about 150° C. higher than said decomposition temperature, and recovering the resultant condensation product.

12. The condensation product formed by the process defined in claim 1.

References Cited in the file of this patent

UNITED STATES PATENTS

| | | |
|---|---|---|
| 2,407,181 | Scott | Sept. 3, 1946 |
| 2,423,497 | Harmon | July 8, 1947 |
| 2,596,967 | Frost | May 20, 1952 |

OTHER REFERENCES

Hurd et al.: "Ind. and Eng. Chem.," vol. 40, No. 11, pages 2078–2081 (1948).